United States Patent
Ben-Natan et al.

(10) Patent No.: US 10,373,058 B1
(45) Date of Patent: Aug. 6, 2019

(54) UNSTRUCTURED DATABASE ANALYTICS PROCESSING

(71) Applicants: Ron Ben-Natan, Lexington, MA (US); Ury Segal, Vancouver (CA)

(72) Inventors: Ron Ben-Natan, Lexington, MA (US); Ury Segal, Vancouver (CA)

(73) Assignee: JSONAR, INC., Lexington, MA (US)

( * ) Notice: Subject to any disclaimer, the term of this patent is extended or adjusted under 35 U.S.C. 154(b) by 813 days.

(21) Appl. No.: 14/264,413

(22) Filed: Apr. 29, 2014

Related U.S. Application Data

(60) Provisional application No. 61/961,253, filed on Oct. 10, 2013.

(51) Int. Cl.
| | |
|---|---|
| *G06F 17/00* | (2019.01) |
| *G06N 5/02* | (2006.01) |
| *G06F 16/338* | (2019.01) |
| *G06F 16/33* | (2019.01) |

(52) U.S. Cl.
CPC .......... *G06N 5/025* (2013.01); *G06F 16/338* (2019.01); *G06F 16/3334* (2019.01)

(58) Field of Classification Search
None
See application file for complete search history.

(56) References Cited

U.S. PATENT DOCUMENTS

| | | | | |
|---|---|---|---|---|
| 2004/0143417 A1* | 7/2004 | Hedlund | ............. | G06F 11/2257 702/183 |
| 2007/0050379 A1* | 3/2007 | Day | ................ | G06F 17/30554 707/999.1 |
| 2013/0166515 A1* | 6/2013 | Kung | ................... | G06Q 10/063 707/690 |
| 2014/0337005 A1* | 11/2014 | Abdel-Hady | ........... | G06F 17/20 704/2 |

OTHER PUBLICATIONS

Understanding the Computer Tamara Smyth, tamaras@cs.sfu.ca School of Computing Science (Year: 2009).*

\* cited by examiner

*Primary Examiner* — Luis A Sitiriche
(74) *Attorney, Agent, or Firm* — Armis IP Law, LLC

(57) ABSTRACT

An analytics processing system generates analytics from a collection of unstructured data by identifying trends in the data and deriving associations or correlations between series of values. Each series is generated from a set of field labeled values in the set, and compared to other series in the collection. Identified relationships in the series are scored based on depiction of an illustrative, predictive, or non-random association, and ranked by a scoring metric for analytical value. A visualization of the relationships are ranked and rendered such that the visualization highlights the association in a manner not achievable by simple inspection of the field values. Relationships are graphed by lines, circles, bars (histogram) on labeled axes based on the series. In this manner, a user may generate analytic results from a large data set, and pinpoint significant associations by paging through renderings scored as the most illustrative of notable trends.

15 Claims, 9 Drawing Sheets

UNSTRUCTURED DATABASE ANALYTICS PROCESSING

RELATED APPLICATIONS

This patent application claims the benefit under 35 U.S.C. § 119(e) of U.S. Provisional Patent App. No. 61/961,253, filed Oct. 10, 2013, entitled "SYSTEM AND METHOD FOR EXPLORATORY ANALYTICS THROUGH ALGORITHMIC-GENERATED VISUALIZATIONS," incorporated by reference in entirety.

BACKGROUND

Unstructured databases are becoming a popular alternative to conventional relational databases due to the relaxed format for data storage and the wider range of data structures that may be stored. In contrast to conventional relational databases, where strong typing imposes data constraints to adhere to a predetermined row and column format, unstructured databases impose no such restrictions.

Unstructured databases have no formal field or record structure, and may be more accurately characterized as a collection of facts. Unlike their structured counterparts, typically a SQL (Structured Query Language) database, which denotes data in fixed length fields enumerated in records in a tabular form, an unstructured database labels fields for storing values in a document. A set of documents defines a collection, in which the documents in a collection may share some, none, or all of a particular field. Due to the unstructured nature, however, conventional analytical approaches for generating and analyzing trends may not lend themselves will to an unstructured database. Since there are effectively no formal bounds or range, it can be difficult to analyze or extract conclusory results, due to computational intensity or complexity.

SUMMARY

A system, method and graphical user interface (GUI) generates analytics from a collection of unstructured data by identifying trends in the data and deriving associations or correlations between series and sequences of values. Each series is generated from a set of field labeled values in the set, and compared to itself and other series in the collection. Identified relationships in the series are scored based on depiction of an illustrative, predictive, or non-random association, and ranked by a scoring metric for analytical value. Visualizations of the relationships are ranked based on the score, and rendered such that the visualization highlights the association in a manner not achievable by simple inspection of the field values. Relationships are graphed by lines, circles, bars (histogram) on labeled axes based on one or more of the series. The resultant graph may illustrate the analytic result by a particular shape, curve, or region depending on the chart or graph type employed for rendering the relationship, and may be more visually apparent in a particular chart type. In this manner, a user may generate analytic results from a large data set, and pinpoint significant associations by paging through renderings scored as the most illustrative of notable trends shown by the data.

Exploratory analytics tools have emerged to help data scientists find the proverbial "needle in the haystack." Such tools provide data analysts and data scientists with ways to find patterns in data. These tools come in various forms—charting packages, statistical analysis tools and others. Conventional exploratory analytics tools place the burden of expressing the result sought, or "what to look for," on the user. While such conventional approaches may provide the user with helpful facts on distributions, the user has to identify what it is they want to look at, what are the data dimensions, and make other assumptions that limit the scope and effectiveness of gleaning all results and trends which may be submerged in a large collection of unstructured data.

Configurations herein are based, in part, on the observation that unstructured databases, due to the ease with which large volume of data may be stored, may include an expanse of data that may be difficult to query due to the relative sparsity of probative facts. Since unstructured databases can easily receive an extract or "dump" of data from a large data store, there may be many information items that are sparse or define only a random relation with other informational items. Unfortunately, conventional approaches may present obstacles to focusing or targeting retrieval operations (queries) directed to retrieving meaningful analytic results, due to the sparsity of significant correlations or associations between data values. Accordingly configurations herein substantially overcome the shortcomings of data sparsity by providing a system and method for identifying trends between data items in an unstructured database, ranking the identified trends according to a scoring metric for evaluating non-trivial correlations, and presenting a visualization (i.e. chart or graph) of the ranked trends for graphically illustrating analytic trends in the data.

In an example configuration, an application for invoking an unstructured database for exploratory analytics using auto-generated visualizations is disclosed. Starting from data that may include many attributes and data sets, the application creates sets of combinations for data series by selecting from available data, which may include very large collections of sparse, unstructured data. The application also selects from possible visualization types, such as different graph formats. The application then scores each such selection given the data attributes and creates a sorted list of visualizations, the score indicating how likely that visualization is likely to be of interest to the user. The user can then iterate through these visualizations to identify analytic data of value, upon which the user can further explore the data using conventional charting tools. In a general configuration, the application performs a method for retrieving data by identifying trends in a collection, and generating a series of proposals indicative of the identified trends, in which the proposals are based on a set of rules for recognizing statistical anomalies represented in the collection. The application then renders a visualization of an identified trend corresponding to a selected one of the proposals.

Alternate configurations of the invention include a multiprogramming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
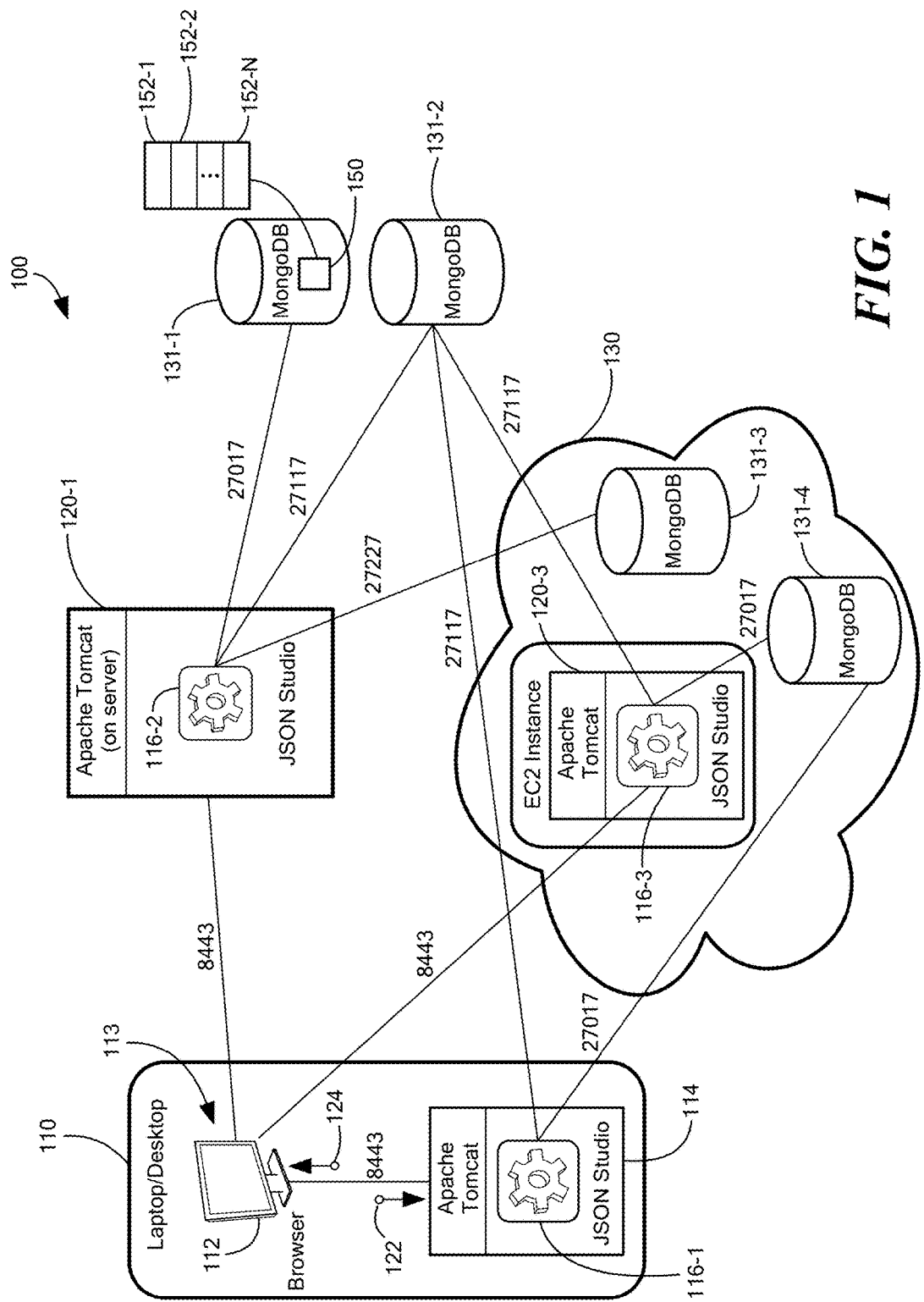
FIG. 1 is a computing environment suitable for use with configurations disclosed herein.

Depicted below is an example configuration of a system and application for performing exploratory analytics on collections of unstructured data. The system provides a method and apparatus for gathering analytics from an unstructured data repository and visually rendering the data to view trends and associations in visualizations of different graph and chart types using various series of data from the collections.

In the approach disclosed herein, the user is given access to multiple dimensions of the data and can select which dimensions to view using the chart control pane shown in further detail below. The user first picks from a variety of chart/visualization types and then defines the data that should be used (plotted) by the chart. Different charts and visualization types require different series types and numbers. Each time the user selects a chart type, the system shows what series it requires for the user to fill in or drag in. Generally, each series is derived from a field in a collection of unstructured data. Fields that do not appear in all or substantially all records of a collection may be selected, but may generate sporadic or trivial results, so generally a meaningful series corresponds to a field that appears fairly consistently throughout each document in a collection. Generally, the visualized trend indicates an analytical significance of the data in the collection by rendering a pattern depicted by the data, such as a correlation, divergence, parallelism, or other relationship or association between the series analyzed in the collection.

In the discussion that follows, a collection is a file of unstructured data, and includes a set of documents, each including one or more fields. Each field has a label and a value, and a field often appears in multiple or all documents of a collection. The set of values contained in a commonly labeled field across the documents in the collection defines a series of values that is employed for analytics as discussed herein. Each visualization is a graph of one or more series or computations performed on the series. An application is a set of instructions compiled and/or linked into an executable entity (computer program) for execution by a processor for performing operations on data by receiving input from a user, performing operations called for by the user instructions, and rendering output, typically on a visual display, responsive to the user input and corresponding request, such as a query.

In addition to allowing the user to manually manipulate these visualizations, the application also performs a method by which the system can recommend "interesting" visualizations and makes it easy for the user to explore the data. In the example arrangement, this includes the following steps.

1. The user specifies whether they want to focus on one type of visualization or wants to let the system determine the visualization completely automatically. This is done by selecting from the chart type pull down shown in FIG. 4 below or leaving it empty.

2. The user then invokes a shuffle operation for computing, scoring, and ranking results of analytics found in the selected collection or collections. Configurations herein employ a labeled "I feel lucky" button (or shuffle button) show below to invoke such an exploratory visualization.

3. Upon the first such click (invocation), the system generates a set of proposals for visualizations. If the user picked a specific chart type, only this type is generated. If the user left it empty, the system generates all types of visualizations that it knows how to generate. The system typically generates a very large number of such proposals using all possible dimensions in the original data collection.

4. The system then iterates through the different proposals and generates a score for each one. The score is meant to reflect how valuable the visualization is believed to be to the user. For example, a visualization of a series that has only a single value in a pie/circular chart will likely not be of much interest to a user. A visualization that is based on a parent/child (hierarchical) relationship is not going to be effective if the data sets chosen do not have data that derives from such a relationship.

5. The system then sorts all proposals generated according to the generated score and discards all but a specified number of proposals. The assumption is that the number of proposals generated is much higher than the number of proposals that the user will iterate through and therefore the remainder includes the highest-scoring proposals.

6. The user is then presented with the first (highest scoring) visualization generated. The user can then directly manipulate the data further. If this visualization is of no value to the user they can click the shuffle button once more and the next chart/visualization from the selected options sorted by the score is presented. In this manner the user is provided with a variety of ways to look at the data, but relieved of the burden of having to learn and analyze the data up-front. Both the user directed and system ranked analytics are discussed below.

FIG. 1 is a computing environment 100 suitable for use with configurations disclosed herein. The configuration of FIG. 1 shows an example arrangement of computing devices for practicing the principles discussed herein, however any suitable network or local computer platform will suffice. Referring to FIG. 1, a user computing device 110 includes a visual display 112 for rendering a browser or other visual medium, and an application processor 114 for launching and executing local and/or remote applications 116-1 . . . 116-3 (116 generally). The visual display 112 present a graphical user interface (GUI) for user interaction, and receives input from a user and renders output visualizations of the analyzed data, as discussed further below. Any appropriate device may be employed, such as mobile devices (smartphones, tablets), laptops, desktops, or other computing device suitable for user interaction, rendering and Internet connectivity. The application 116 may interact with other servers 120-1 . . . 120-2 (120 generally), which may be accessible via a public access network 130 such as the Internet. The application 116 employs one or more network links, often identified by ports (8443, 27017, 27117, 27227), for invoking a database service provided via database servers 131-1 . . . 131-4 (131 generally), having unstructured data stored in collections 150. Each collection includes a number of documents 152-1 . . . 152-n (152 generally). Using operations and methods disclosed further below, the application 116 receives a query request 122 from a user, and invokes the database servers 131 for generating a response 124, such as a visualization 113 as disclosed below.

Figure 2:
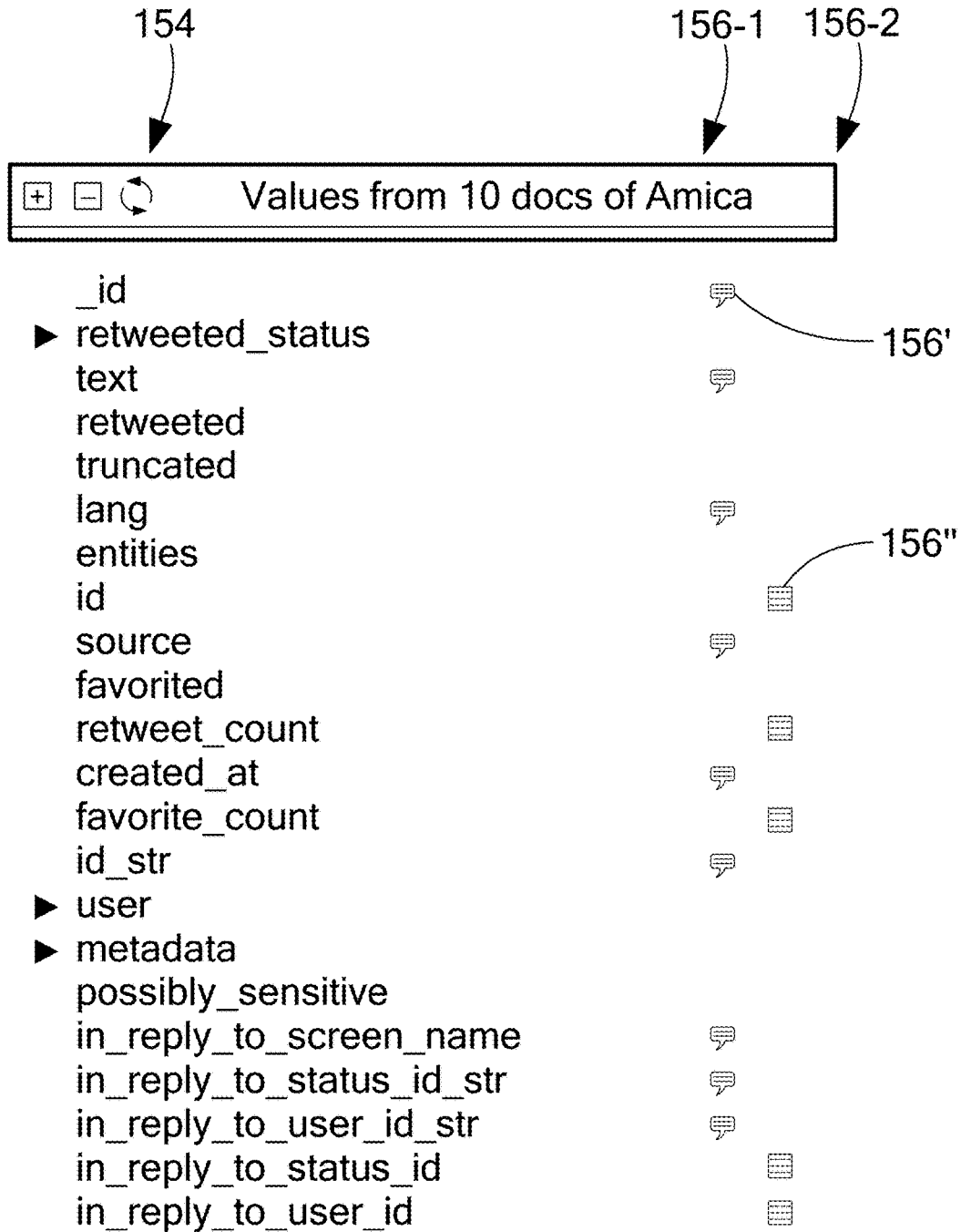
FIG. 2 is a GUI (Graphical User Interface) screen in the environment of FIG. 1 for displaying a synopsis of a collection.

FIG. 2 is a GUI (Graphical User Interface) screen in the environment of FIG. 1 for displaying a synopsis of a collection 150. Referring to FIGS. 1 and 2, each collection 150 has a number of fields 154 that occur at least once across the documents 152 in the collection. A type indicator 156-1 . . . 156-2 (156 generally) indicates if the field refers to text or numeric data, shown by icons 156' and 156'', respectively. Other data types 156 may also be added. Based on the type of data, the application 116 makes decisions about whether to employ the data for plots and computations or as labels for dimensions.

Figure 3:
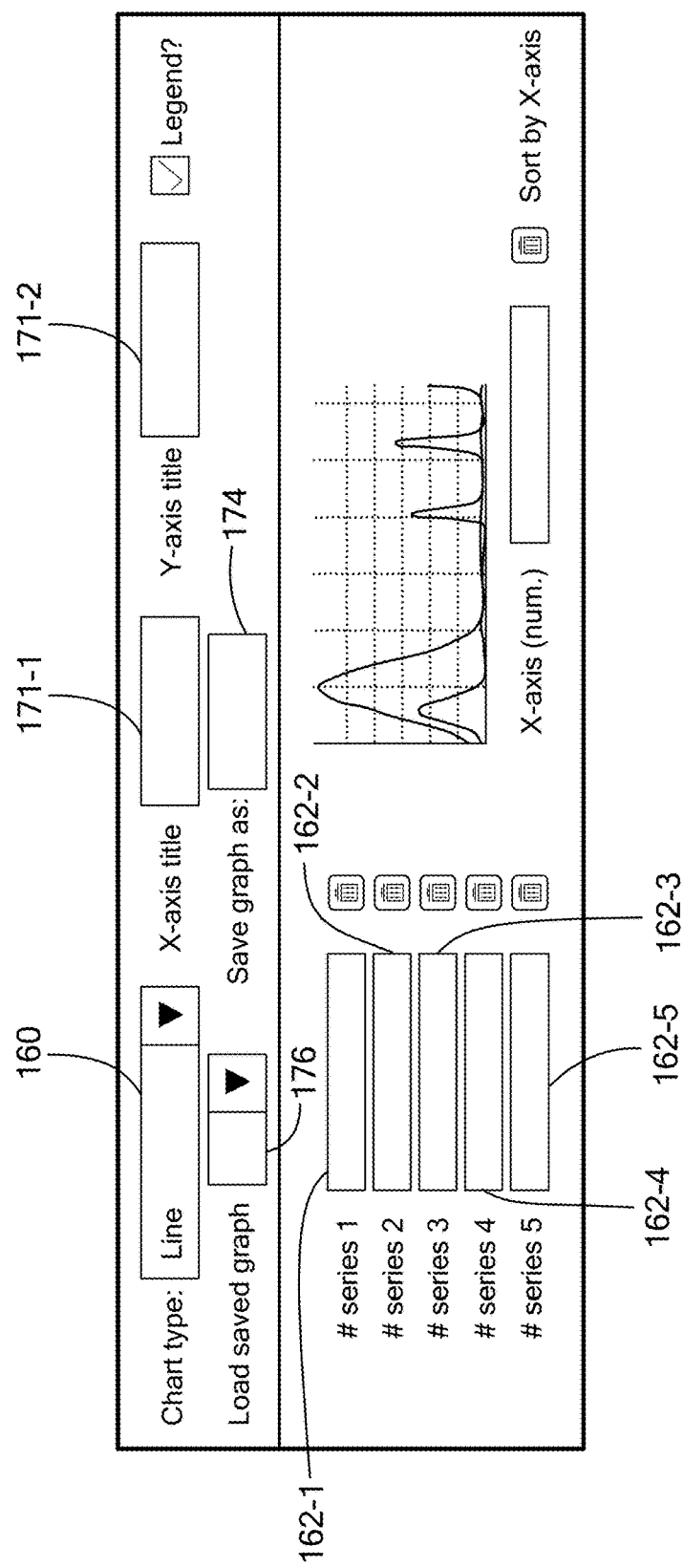
FIG. 3 is a GUI screen for selecting a series of values from the collection to employ in a visualization.

FIG. 3 is a GUI screen for selecting a series of values from the collection to employ in a visualization 113. Referring to FIGS. 1-3, in an interactive mode, the user selects which chart type 160 to generate from the pull down (shown below in FIG. 4). The chart type 160 determines the manner of graphing data for the visualization 113, such as a histogram, line graph, circular (pie) graph, and others. Each chart type has a number of dimensions applicable to fulfill the visualization requirements, or a range of dimensions graphable before overcrowding the display. Dimensions are selected from the fields 154 by entering or dragging data dimensions from the list shown in FIG. 2 to the input boxes 162-1 . . . 162-5 (162 generally) to denote the series used for the visualization 113.

Field selection for identifying the trends further includes decomposing the collection into at least one column, such that each column represents a field 154 from the collection, and determining a type of the data in each column. Decomposing may further include organizing the collection into columns, such that each column represents a field 154 or subfield from a hierarchy of the fields. In the case of subfields (i.e. dot notation), the subfields are "flattened" so that each column represents an atomic (not compound) field value. The application 116 generates a statistic for each column, and computes a score based on the generated statistics and a set of rules for weighting each of the statistics generated for the collection 150.

Figure 4:
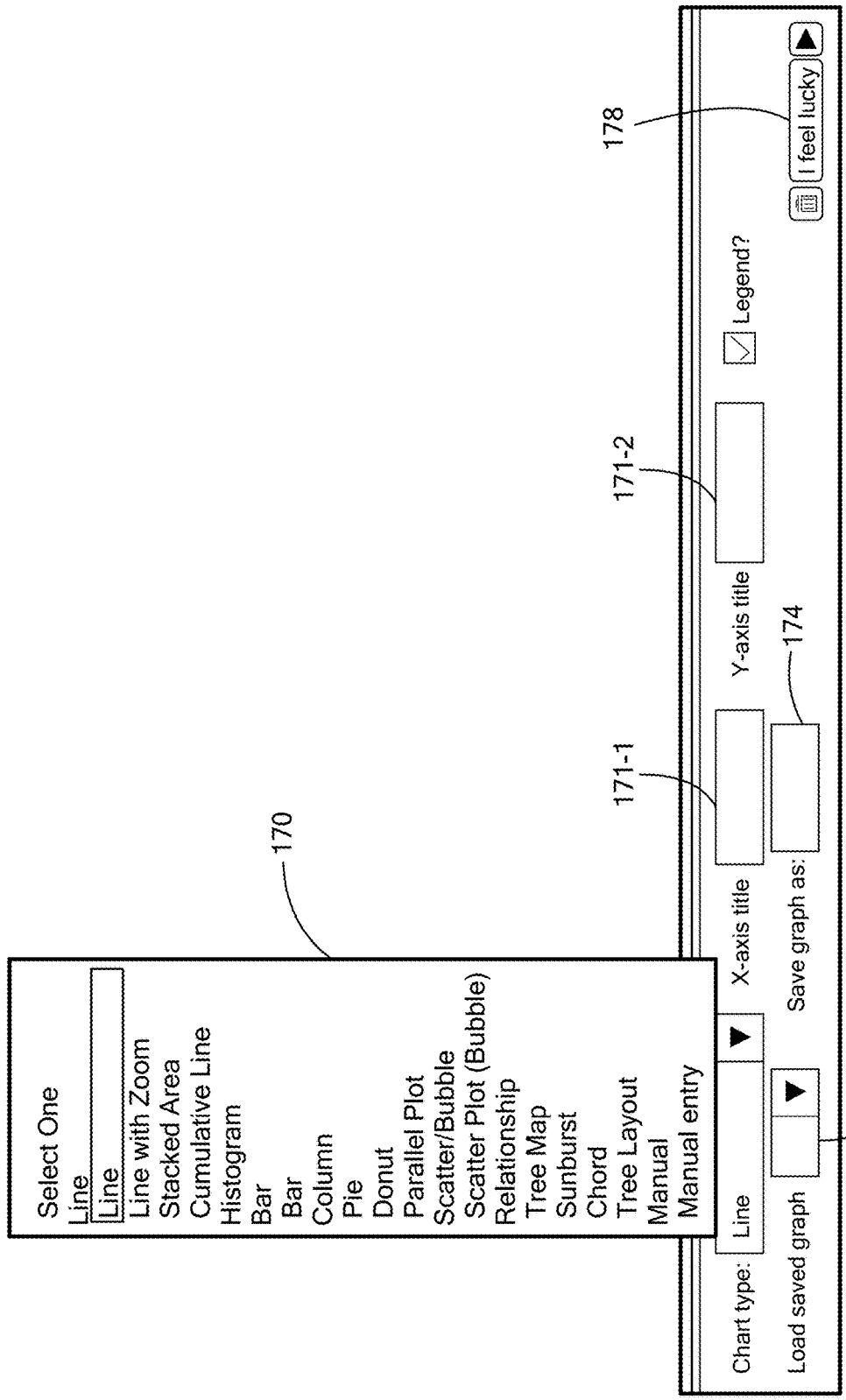
FIG. 4 is a GUI screen for selecting a type of visualization.
Figure 5A:
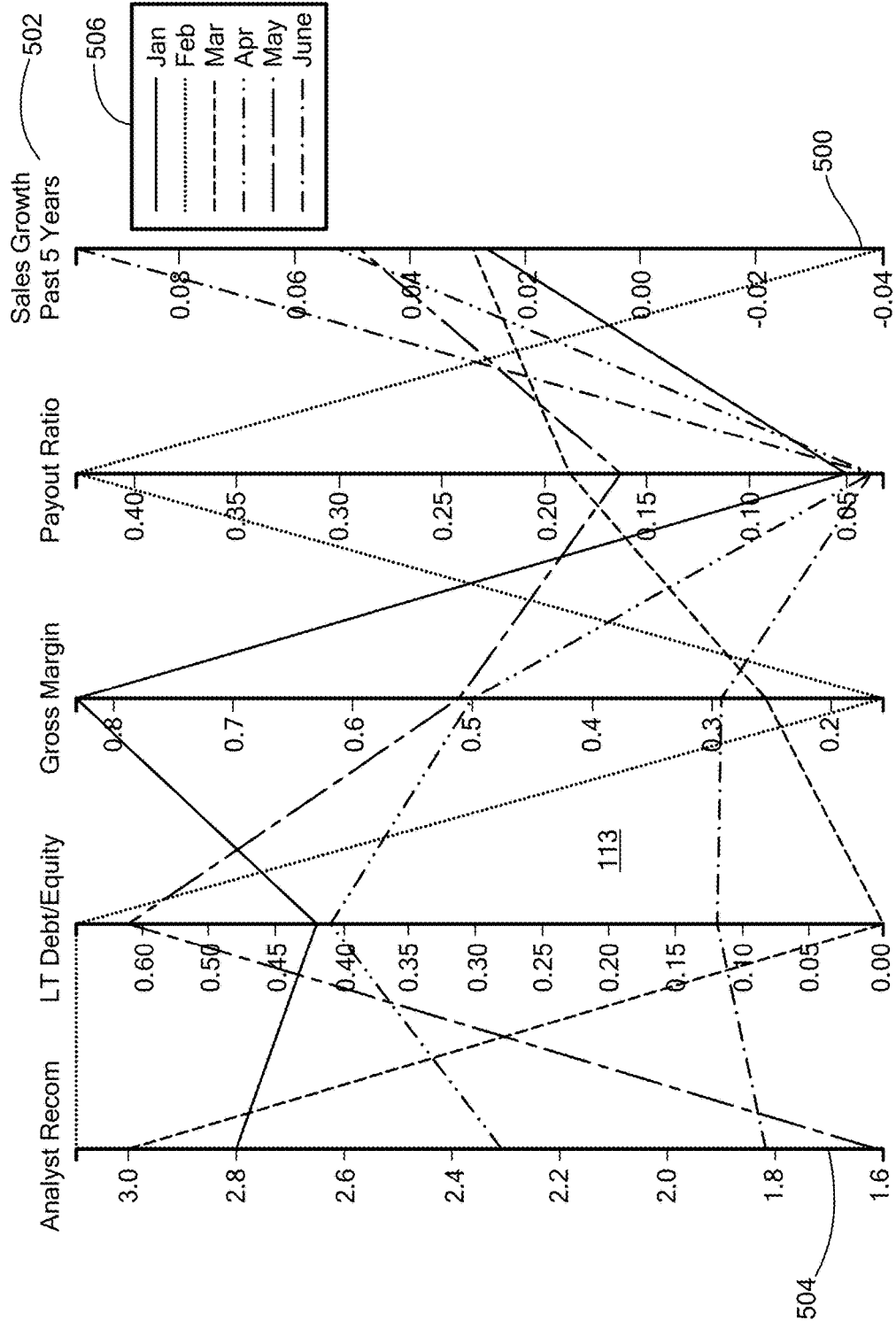
FIGS. 5*a*-5*e* are example renderings of available visualizations.

FIG. 4 is a GUI screen for selecting a type of visualization. Referring to FIGS. 3 and 4, a chart type pull down 170 denotes the available chart types 160 that the visualization 113 may provide. Different chart types may lend themselves better to various combinations of the computed value series. For example, a plurality of numeric series corresponding to a common label might be represented in a line graph with each of the numeric series represented by a line and the common label defining a horizontal axis, such as in FIG. 5a below. A dual numeric ranking might be best illustrated in a histogram with each series defined by a separate bar adjacent to the other numeric series, similar to FIG. 5d, while a set/subset containment of values might be best illustrated by a tree or sunburst type (shown below in FIG. 5b). For mapping the series from the columns to dimensions of the visualization, the application 116 identifies the type of data in the column, and computes, if the data type is numeric, a statistic, and determines, if the data type is text, a numeric field having corresponding values for each of the values in the text column. Visualization therefore includes identifying a series of values represented by the columns 154 and defining an association to the identified series, such that the association is indicative of a renderable feature of the trend, suitable to be depicted by graphing in at least one of the available chart types for visualization.

Axis titles may be entered in axis label boxes 172-1 . . . 172-2, and generated charts/graphs may be stored and recalled by filename window 174 and load window 176. An alternative approach is to allow the application 116 to identify trends in the collection by generating a series of proposals indicative of the identified trends, such that the proposals are based on a set of rules for recognizing statistical anomalies represented in the collection, and rendering a visualization 113 of an identified trend corresponding to a selected one of the proposals. A user may either leave the chart type empty or select one of the chart types 170 and then click the "I feel lucky"/shuffle button 178 to initiate the process and then to iterate through the proposals.

In the example arrangement, therefore, generating the proposals further includes selecting a chart type 170 indicative of a format and organization of the visualization, and identifying dimensions 154 renderable on the selected chart type 170. The application 116 then maps one of the identified series to each of the identified dimensions on the visualization 113. Computing the score further includes identifying factors based on the selected chart type, and selecting a candidate series based on the identified chart type. The candidate series will be graphed and/or plotted on the chosen chart type. The application 116 accumulates the score based on the identified factors applied to the candidate series for the chart type, discussed further below. Selection of associations for rendering on the visualization 113 may further include identifying a mandatory condition for the association, and determining if the association satisfies the mandatory condition, such that the mandatory condition is indicative of a computability of a renderable feature of the association on the selected chart type. Rendering may also involve identifying a preferable condition, such that the preferable condition is for assessing if the association has a probative informational value beyond a random association, and supplementing an association with a default value for rendering a graphical depiction of the association on the selected chart type. For example, a constant factor may be supplemented if a computed or other series of values does not result in a score indicative of meaningful results.

FIGS. 5a-5e are example renderings of generated visualizations 113 from the shuffle button 178, which allows the user to iterate through a scored set of proposals yielding many visualization types—examples of visualizations 113 which were auto-generated by the application 116 using the same collection. Referring to FIGS. 1-5e, FIG. 5a shows a line graph visualization 500. The visualization 113 has a horizontal axis 502 labeled with fields, and a vertical axis 504 denoting a numerical range. A plurality of graphs lines 506 are identified by field labels from a corresponding series from the collection 150. Such a line graph is useful for identifying a correlation between values in commonly named fields across different series.

Figure 5B:
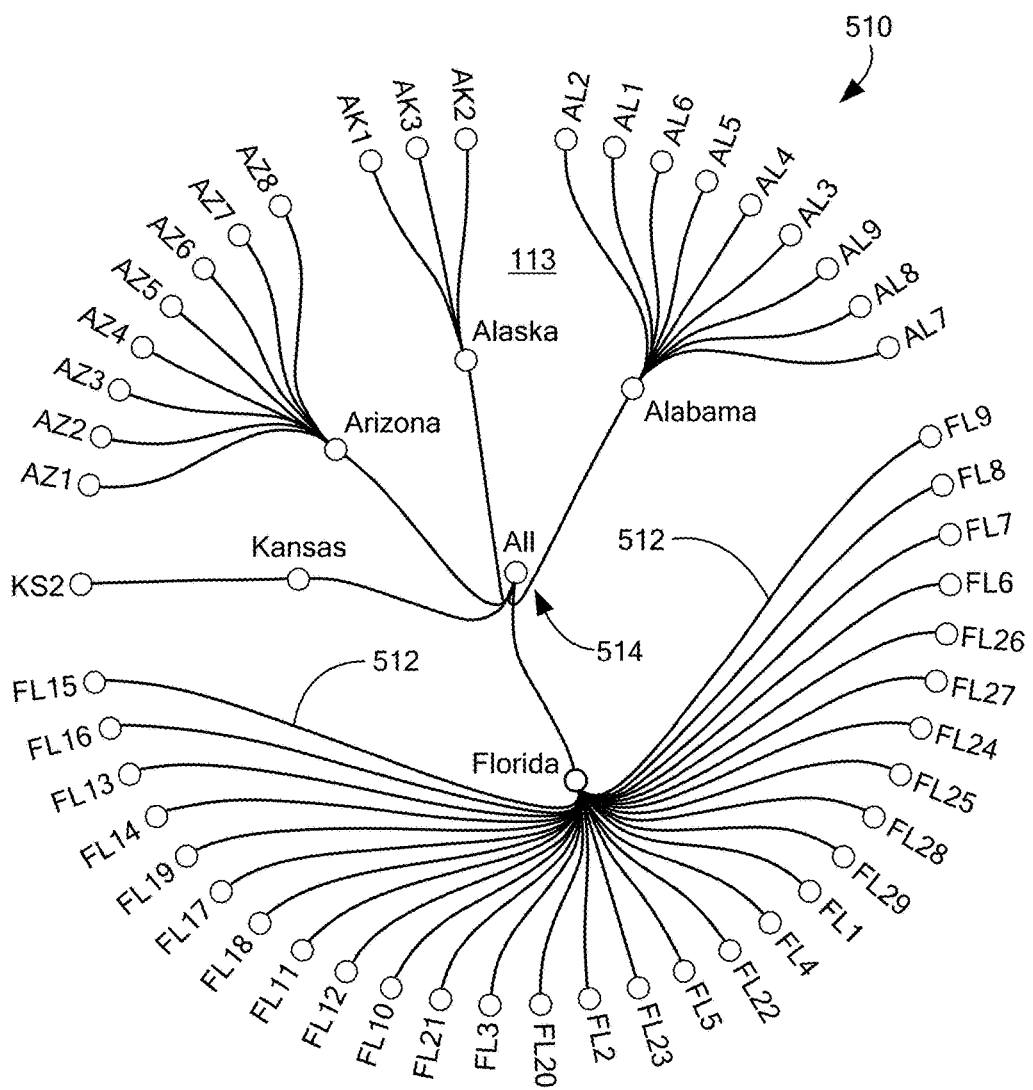

FIG. 5b denotes a sunburst graph type denoting political orientations of geographical regions. The visualization 510 depicts Democratic and Republican dominated state regions are listed, and geographical regions for which no specific conclusion can be drawn (i.e. New England) are listed as such, all designated by spokes 512 from "All" regions denoted by a hub 514.

Figure 5C:
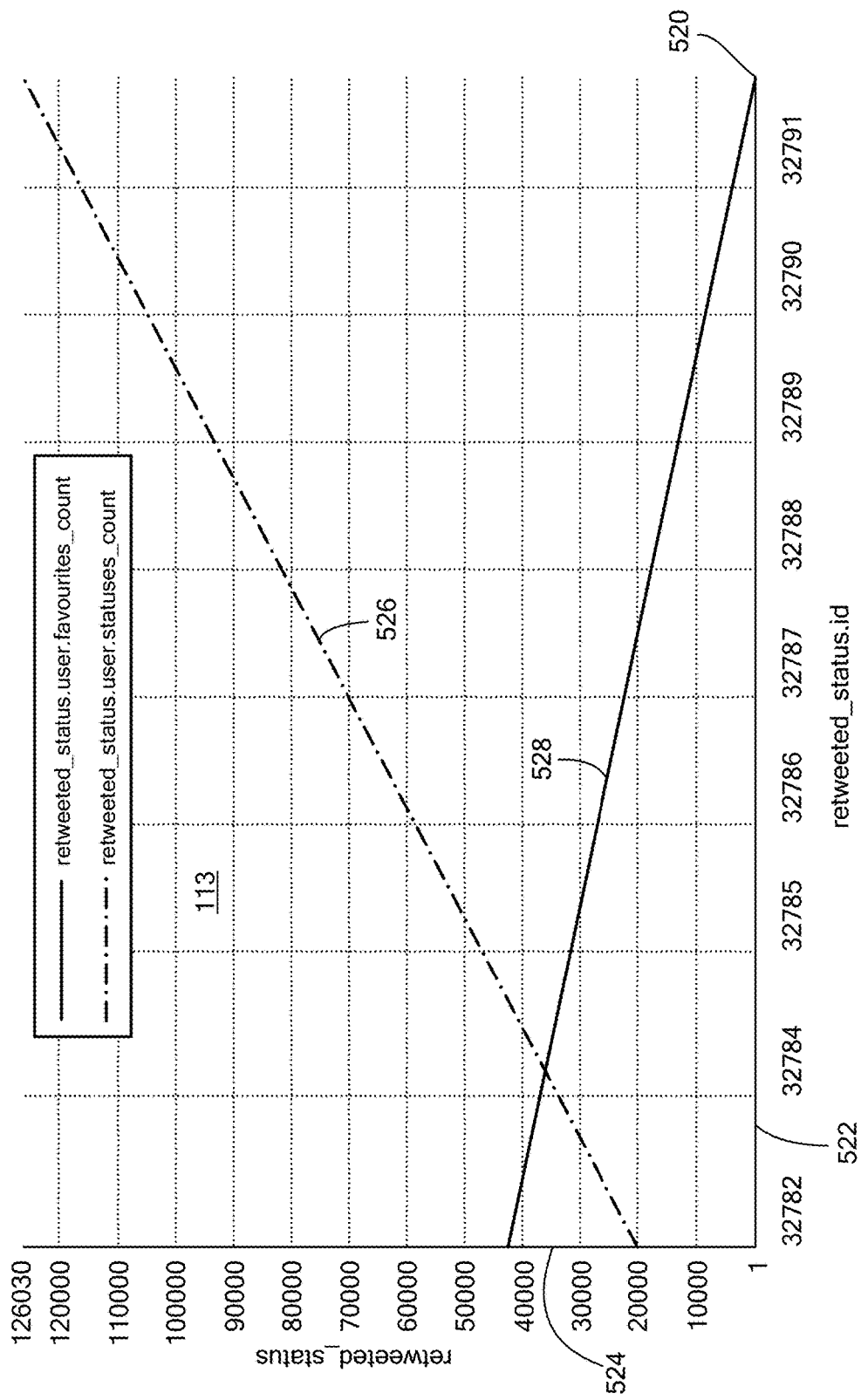

FIG. 5c shows an example line graph 520 with numerical axes 522, 524 plotting series 526 and 528. The plotted lines 522, 524 demonstrate proportional linear variance in the series they represent.

Figure 5D:
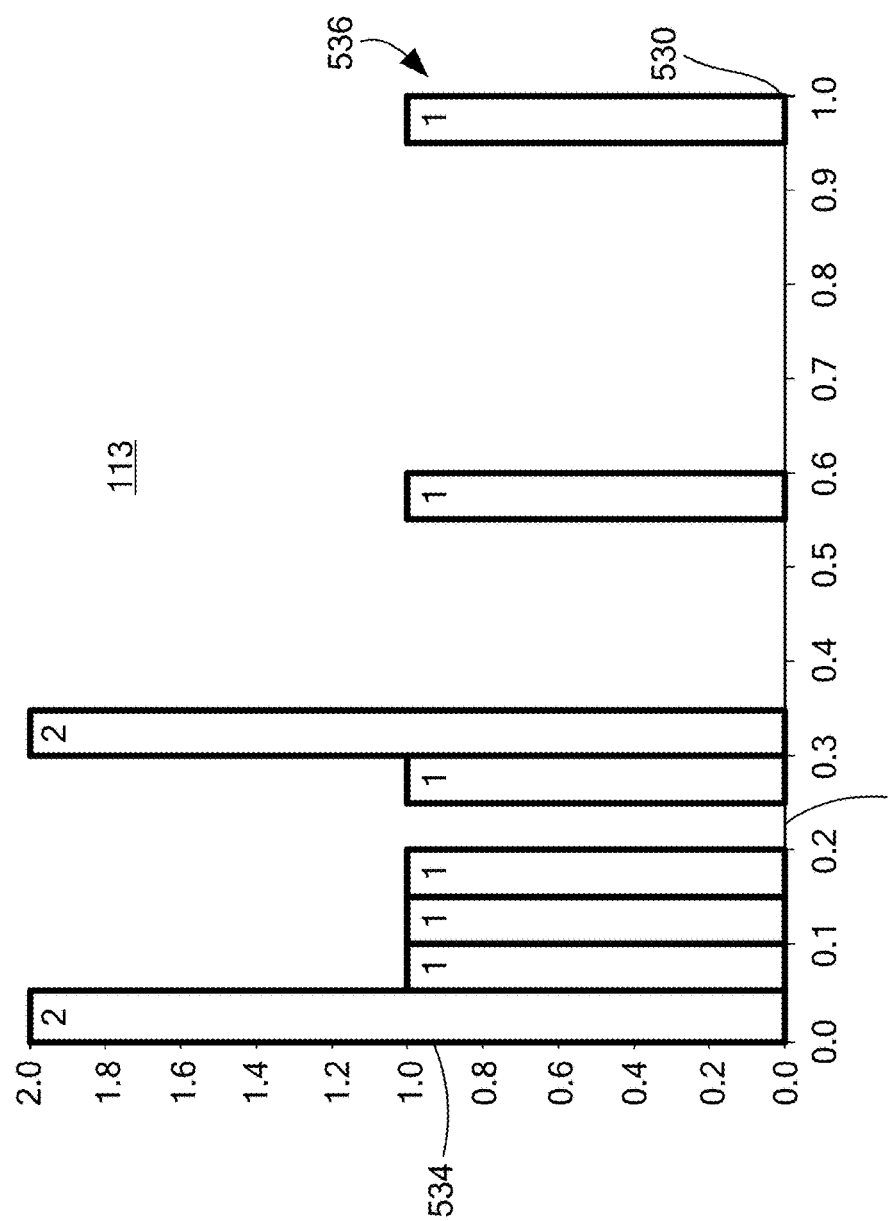
Figure 5E:
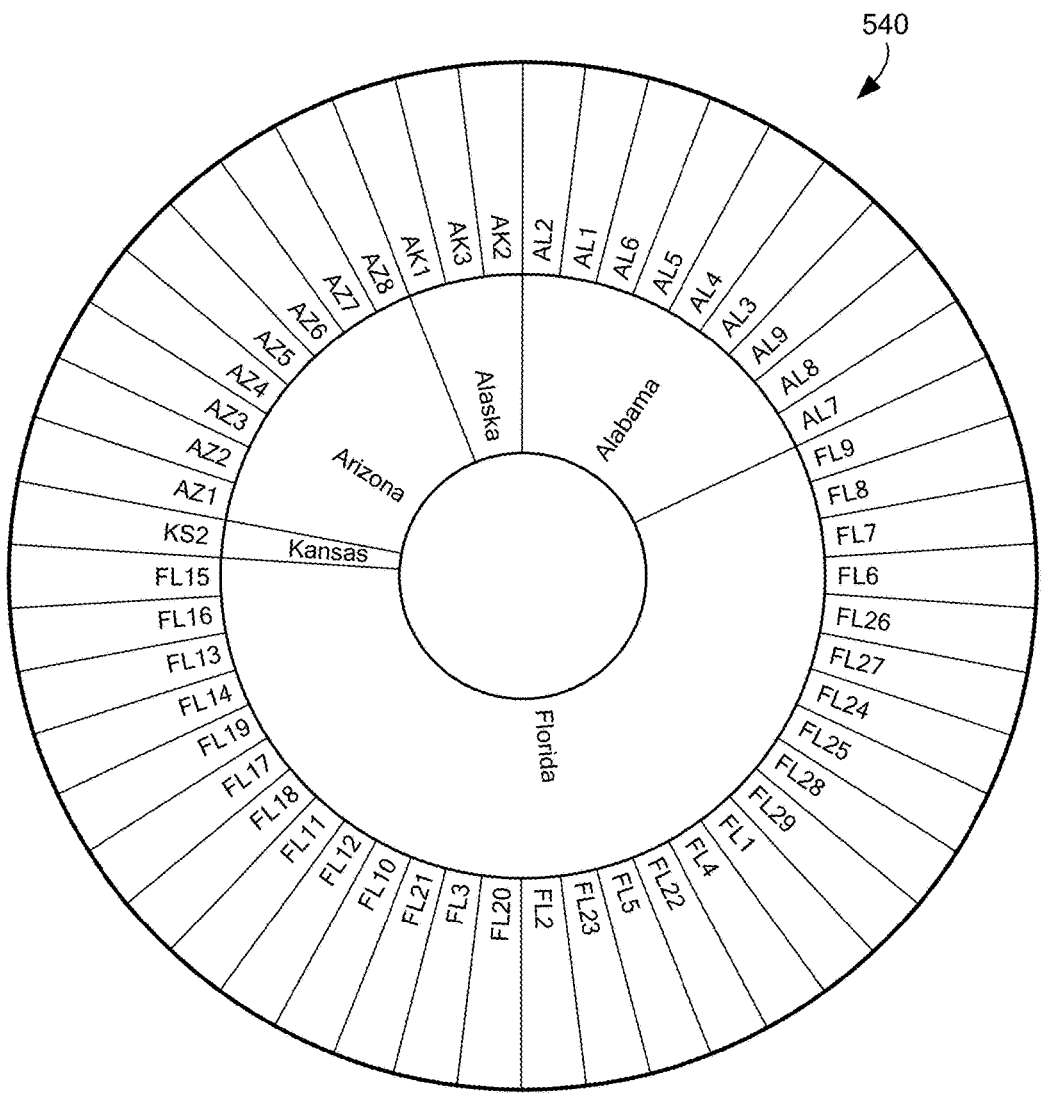

FIG. 5d is a histogram 530 with numerical axes 532, 534, showing a third value 536 in a histogram visualization 113, and FIG. 5e shows the data of FIG. 5b in a multi-level circular ("donut") graph. A variety of the series from the collection and chart types 170 may be selected by the user or computed and sorted by the application for deriving association and trends from the collection in a graphical manner that captures features and statistical significances that may not be readily apparent from reading the textual data alone.

Each of the visualizations in FIGS. 5a-5e are among the multiple types of visualizations rendered by the shuffle operation. Each visualization defines a proposal scored and ranked by the system to generate meaningful and illustrative results depicting associations between dimensions or aspects of the data. In the example arrangement, the application performs the following in the selection of proposals.

The number of proposals that will be created is a parameter of the system. The default is 300—i.e. 300 proposals will be created. There is also a parameter that determines how many proposals will be kept after the scoring (the default being 100).

There is a parameter in the system for "randomness". This is a number between 0 and 1 with the default being 0. This random effect affects every decision made in the selection process as well as in the scoring process. For example, there is an algorithm that determines how to select series for a chart. But if the randomness value is 0.3 then the series selected will be 70% based on the selection logic and 30% of the time will be selected at random. The same is true with the scoring—the score is a deterministic calculation but as the randomness variable is increased then the score gets more and more of a random value. This parameter has been added because any deterministic selection will pick the same types of visualizations and the user may decide that a random effect is more likely to yield interesting but unexpected variations.

Each visualization type has conditions that are "must haves" and conditions that are "nice to have"—these determine which data sets are used based on the chart type. For example, a line chart must have at least two numeric series with the same number (for the x and y axis). If the data set does not have two numeric series then a line chart is not possible. A sunburst visualization has a parent/child relationship. If the data does not have two data series that have any intersection then they cannot be plotted as a meaningful sunburst. An example of a nice to have is a scatter plot (or bubble plot) which has x and y numerical dimensions but can also have a numerical dimension for the bubble size. If the data set does not have a third numeric dimension then the scatter plot can still be plotted (using a size of 1 for each bubble), but a data set that includes a size dimension may provide more valuable information to a user.

Scoring the proposals for ranking adheres to several guidelines, and includes a set of rules for scoring and ranking. Each visualization type has its own scoring algorithm. Scoring algorithms may be changed and tuned over time. Scoring algorithms may include a random factor as disclosed in the previous subsection.

Scoring takes two kinds of factors—factors that are internal to a single dimension and factors that are about an interaction between two or more dimensions. Thus, computing the score may include identifying factors based on a single dimension, and increasing or accumulating the score based on consistency of variations of the identified factors, such as variance of values, signal-to-noise (SNR) ratio or the coefficient of variation. Alternatively, computing a score may include identifying factors based on a plurality of dimensions, such that each dimension is based on a series of values in one of the fields, and increasing or accumulating the score based on a correlation between corresponding values each of the series. Although each chart type (visualization) has its own scoring method, all methods are normalized so that a score for chart type A may be compared with the score of chart type B.

An example of a scoring scenario is as follows. Upon invocation of the shuffle operation via the "I feel lucky" button to commence exploratory visualization, the application 116 obtains results of a query or aggregation to generate a collection of unstructured data. This aggregation may employ a collection in its present state, or may involve very complex processing for queries and selection. The application 116 decomposes the collection into columns using recursive descent (dot notation), and classifies each column based on type—e.g. numeric, text, date, etc. The application builds statistics for each column—e.g. size of data set, SNR or other criteria, and build a predetermined number (N) of proposals or options for user review (see below; N is a parameter). The application computes a score for each proposal, and keeps the M options with highest scores, for presenting to user, where N>M (usually N>>M). In performing the exploratory visualization analysis, options for building meaningful series (dimensions) include several selections. A user may select a chart type or allow the application 116 to select a chart type. The application defines an enumeration of chart types—e.g. {"lineChart", "cumulativeLineChart", "stackedAreaChart", "lineWithFocusChart", "scatterChart", "multiBarHorizontalChart", "multiBarChart", "cumulativeLineChart", "pieChart", "donut", "parallel", "treemap", "sunburst", "treelayout", "histogram", "chord" }, however any suitable graphical format could be defined as a visualization format.

Each chart type defines how many data series it needs and their types (e.g. numeric vs. text). Some chart types also require certain conditions on the data (e.g. treemap numeric series cannot be negative). Options are selected for data series similarly as combination of round/robin and random, and to ensure that selection is not a duplicate of series already employed in the current visualization.

Score options are accumulated for the visualizations and ranked to present the most salient results first, including:

Multiple factors—some the same for all chart types and some specific to chart type Factor weights are parameters and/or uniform and/or use random factor (three can be combined—e.g. use random 33% of the time)

Factors always add up to 1

Weights can be tuned over time and depending on data

Sizes of data sets is one important factor used in all chart types—i.e. identical sizes are preferred and similar sized better than totally different sizes Existing correlation between numeric series is used for chart types such as lines, parallel plots etc.

Small cardinality of either source and target used for relationship types (treemaps, chords, etc.)

Number of distinct values and signal-to-noise ratio used for all numeric series

Depth of hierarchy used for treemap, sunburst and chord; note that chord requires low but non-trivial depth and treemap and sunburst low or high.

Some scoring looks at other options chosen and prefers variety—e.g. treemap scoring will look at all chosen treemaps and prefer a varierty of depths rather than all between depth 2.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for retrieving data comprising:
    identifying trends in a collection, identifying the trends further including:
        decomposing the collection into a plurality of columns, each column in the plurality of columns representing a sequence of atomic values from a commonly named field from the collection;
        determining a type of the data in each column;
        generating a statistic for each column; and
    identifying a series of values represented by each of the columns, the collection including a set of documents of unstructured data, each document including one or more fields having a label and a value, such that the series is defined by a file for storing the set of values contained in a commonly labeled field across the documents in the collection;
    computing a score based on the generated statistics and a set of rules recognizing statistical anomalies for weighting each of the statistics generated for the collection, the score based on a correlation of the series of values from a first column to a series of values in a second column;
    defining an association based on the correlation between the first and second columns, and iteratively computing scores for other columns of the plurality of columns, the association indicative of a renderable feature of the trend,
    generating a set of proposals indicative of the identified trends, the proposals based on a subset of highest scoring associations and on a set of rules for recognizing statistical anomalies represented in the collection, generating the proposals further comprising:
        receiving a selection of a chart type indicative of a format and organization of the renderable trends;
        identifying dimensions renderable on the selected chart type; and
        for each proposal, mapping one of the identified series of each of the first and second columns to each of the identified dimensions; and
    rendering a visualization of the identified trend corresponding to a selected one of the proposals.

2. The method of claim 1 wherein decomposing further comprises:
    organizing the collection into columns, each column representing a field or subfield from a hierarchy of the fields.

3. The method of claim 1 wherein the visualized trend indicates an analytical significance of the data in the collection by rendering a pattern depicted by the data.

4. The method of claim 1 wherein computing the score further comprises:
    identifying factors based on the selected chart type;
    selecting a candidate series based on the identified chart type;
    accumulating the score based on the identified factors applied to the candidate series for the chart type.

5. The method of claim 1 wherein computing the score further comprises:
    identifying factors based on a single dimension; and
    increasing the score based on consistency of variations of the identified factors.

6. The method of claim 1 wherein computing a score further comprises:
    identifying factors based on a plurality of dimensions, each dimension based on a series of values in one of the fields; and
    increasing the score based on a correlation between corresponding values each of the series.

7. The method of claim 1 wherein generating the statistics further comprises:
    identifying the type of data in the column;
    computing, if the data type is numeric, a statistic; and
    determining, if the data type is text, a numeric field having corresponding values for each of the values in the text column.

8. The method of claim 1 further comprising:
    identifying a preferable condition, the preferable condition for assessing if the association has a probative informational value beyond a random association; and
    supplementing an association with a default value for rendering a graphical depiction of the association on the selected chart type.

9. The method of claim 1, further comprising:
comparing each of the values from the first column to corresponding values in the second column; and
computing the score based on the aggregate correlation of each set of corresponding values in the collection.

10. The method of claim 1, further comprising applying a randomness factor to the correlation computation for visualizing unexpected variations.

11. An information retrieval device comprising:
an interface to a data repository;
a computer program for identifying trends in a collection, the interface responsive to the computer program for retrieving the collection from the data repository, identifying the trends further including:
decomposing the collection into a plurality of columns, each column in the plurality of columns representing a sequence of atomic values from a commonly named field from the collection;
determining a type of the data in each column;
generating a statistic for each column; and
the computer program configured for identifying a series of values represented by each of the columns and defining an association to the identified series, the collection including a set of documents of unstructured data, each document including one or more fields having a label and a value, such that the series is defined by a file for storing a set of values contained in a commonly labeled field across the documents in the collection,
computing a score based on the generated statistics and a set of rules for weighting each of the statistics generated for the collection, the score based on a correlation of the series of values from a first column to a series of values in a second column, and
defining an association based on the correlation between the first and second columns, and iteratively computing scores for other columns of the plurality of columns, the association indicative of a renderable feature of the trend;
the computer program further configured to generate a set of proposals indicative of the identified trends, the proposals based on a subset of highest scoring associations and on a set of rules for recognizing statistical anomalies and weighting each of the statistics generated for the collection, generating the proposals further comprising:
receive a selection of a chart type indicative of a format and organization of the renderable trends;
identify dimensions renderable on the selected chart type; and
for each proposal, map one of the identified series of each of the first and second columns to each of the identified dimensions; and
an output interface configured to render a visualization of the identified trend corresponding to a selected one of the proposals.

12. The device of claim 11 wherein computing the score further comprises:
identifying factors based on the selected chart type;
selecting a candidate series based on the identified chart type;
accumulating the score based on the identified factors applied to the candidate series for the chart type.

13. The device of claim 12 wherein computing the score further comprises:
identifying factors based on a single dimension; and
increasing the score based on consistency of variations of the identified factors.

14. The device of claim 12 wherein computing a score further comprises:
identifying factors based on a plurality of dimensions, each dimension based on a series of values in one of the fields; and
increasing the score based on a correlation between corresponding values each of the series.

15. A computer program product on a non-transitory computer readable storage medium having instructions that, when executed by a processor, perform a method for retrieving data, the method comprising:
identifying trends in a collection, identifying the trends further including:
decomposing the collection into a plurality of columns, each column in the plurality of columns representing a sequence of atomic values from a commonly named field from the collection;
determining a type of the data in each column;
generating a statistic for each column; and
identifying a series of values represented by each of the columns, the collection including a set of documents of unstructured data, each document including one or more fields having a label and a value, such that the series is defined by a file for storing the set of values contained in a commonly labeled field across the documents in the collection;
computing a score based on the generated statistics and a set of rules recognizing statistical anomalies for weighting each of the statistics generated for the collection, the score based on a correlation of the series of values from a first column to a series of values in a second column;
defining an association based on the correlation between the first and second columns, and iteratively computing scores for other columns of the plurality of columns, the association indicative of a renderable feature of the trend;
generating a set of proposals indicative of the identified trends, the proposals based on a subset of highest scoring associations and on a set of rules for recognizing statistical anomalies represented in the collection, generating the proposals further comprising:
receiving a selection of a chart type indicative of a format and organization of the renderable trends
identifying dimensions renderable on the selected chart type; and
for each proposal, mapping one of the identified series of each of the first and second columns to each of the identified dimensions; and
rendering a visualization of the identified trend corresponding to a selected one of the proposals.

* * * * *